US008283416B2

(12) United States Patent
Beniya et al.

(10) Patent No.: US 8,283,416 B2
(45) **Date of Patent: *Oct. 9, 2012**

(54) PROCESS FOR MANUFACTURING COMPOSITION OF SOLVOLYSIS PRODUCT OF ETHYLENE-VINYL ESTER COPOLYMER

(75) Inventors: Yasufumi Beniya, Osaka (JP); Keisuke Fujimura, Osaka (JP); Akio Harao, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,973

(22) Filed: Jul. 22, 2011

(65) Prior Publication Data

US 2012/0022217 A1 Jan. 26, 2012

Related U.S. Application Data

(63) Continuation of application No. PCT/JP2010/053690, filed on Mar. 5, 2010.

(30) Foreign Application Priority Data

Mar. 9, 2009 (JP) ................................ 2009-054669

(51) Int. Cl.
*C08F 8/00* (2006.01)

(52) U.S. Cl. ...................................................... 525/192

(58) Field of Classification Search .................. 525/192
See application file for complete search history.

(56) References Cited

U.S. PATENT DOCUMENTS

| | | | | |
|---|---|---|---|---|
| 4,349,644 | A | 9/1982 | Iwanami et al. | |
| 5,034,281 | A | 7/1991 | Kawasaki et al. | |
| 5,221,566 | A | 6/1993 | Tokoh et al. | |
| 2007/0178268 | A1 | 8/2007 | Matsui et al. | |
| 2007/0196679 | A1 | 8/2007 | Moriyama et al. | |
| 2009/0186233 | A1 | 7/2009 | Masumoto et al. | |
| 2011/0020626 | A1 | 1/2011 | Okamoto et al. | |
| 2011/0135950 | A1 | 6/2011 | Okamoto et al. | |
| 2011/0166292 | A1* | 7/2011 | Beniya et al. | 525/57 |
| 2011/0178222 | A1 | 7/2011 | Kani | |

FOREIGN PATENT DOCUMENTS

| | | |
|---|---|---|
| EP | 1801154 | 6/2007 |
| JP | 56-86949 | 7/1981 |
| JP | 61-004752 | 1/1986 |
| JP | 2001-18336 | 1/2001 |
| JP | 2004-359965 | 12/2004 |
| JP | 2006-124668 | 5/2006 |
| JP | 2009-13368 | 1/2009 |
| JP | 2009-24076 | 2/2009 |
| JP | 2009-173903 | 8/2009 |
| WO | 2009/084607 | 7/2009 |
| WO | WO 2010/104013 | 9/2010 |

OTHER PUBLICATIONS

U.S. Appl. No. 13/001,808 to Shouichi Kani et al., which was filed on Jul. 2, 2008.
International Search Report in PCT/JP2010/053690 Mailed Jun. 8, 2010.
European Search Report in EP 08 86 7109 completed Jun. 23, 2011.
Extended European Search Report for related European Application No. 10750767.5, dated Jul. 17, 2012.

* cited by examiner

*Primary Examiner* — Nathan M Nutter
(74) *Attorney, Agent, or Firm* — Greenblum & Bernstein, P.L.C.

(57) ABSTRACT

Processes for manufacturing a composition of a solvolysis product of an ethylene-vinyl ester copolymer, which comprises: conducting solvolysis of an ethylene-vinyl ester copolymer (A') and a modified ethylene-vinyl ester copolymer (B') comprising a unit derived from a compound represented by the general formula (2) in one system to manufacture the composition of a solvolysis product of an ethylene-vinyl ester copolymer comprising a solvolysis product (A) of the ethylene-vinyl ester copolymer and a solvolysis product (B) of the modified ethylene-vinyl ester copolymer comprising a unit represented by the general formula (1), wherein a ratio of an ethylene content (B')/(A') of copolymer (A') and copolymer (B') in conducting solvolysis is 1 or more, and a blending ratio (B')/(A') of the ethylene-vinyl ester copolymer (A') and the modified ethylene-vinyl ester copolymer (B') is from 50/50 to 1/99 by weight:

$$-\!\!\left(\underset{R^2}{\overset{R^1}{C}}-\underset{X}{\overset{R^3}{C}}\right)\!\!-\quad X-\underset{OH}{\overset{R^4}{C}}-\underset{OH}{\overset{R^5}{C}}-R^6 \qquad (1)$$

and $$\underset{R^2}{\overset{R^1}{C}}=\underset{X}{\overset{R^3}{C}}\quad X-\underset{OR^7}{\overset{R^4}{C}}-\underset{OR^8}{\overset{R^5}{C}}-R^6. \qquad (2)$$

16 Claims, 3 Drawing Sheets

NORMLIZED HEAT FLOW ENDO UP (W/g)
4.0
3.5
3.0
2.5
2.0
80
100
120
140
160
180
200
TEMPERATURE (°C)

NORMALIZED HEAT FLOW ENDO UP (W/g)
3.5
3.0
2.5
80
100
120
140
160
180
200
TEMPERATURE (°C)

PROCESS FOR MANUFACTURING COMPOSITION OF SOLVOLYSIS PRODUCT OF ETHYLENE-VINYL ESTER COPOLYMER

CROSS REFERENCE TO RELATED APPLICATIONS

The present application is a continuation of International Application No. PCT/JP2010/053690, filed on Mar. 5, 2010, and claims the benefit of priority from Japanese Patent Application No. 2009-054669, filed on Mar. 9, 2009, the contents of which are herein incorporated by reference in their entireties.

TECHNICAL FIELD

The present invention relates to a process for manufacturing an ethylene-vinyl ester copolymer solvolysis product (hereinafter often referred to as an EVOH resin). The product comprises a composition comprising an EVOH resin and a modified EVOH resin, the composition being superior especially in productivity, processability and melt moldability. The invention also relates to a process for manufacturing an EVOH resin composition which has no difference, or an insubstantial difference, in melting peak or which, when there are two or more melting peaks, has an especially small difference between the highest-temperature melting peak and the lowest-temperature melting peak.

BACKGROUND ART

In general, EVOH resins exhibit excellent transparency, gas barrier properties, aroma retention, solvent resistance, oil resistance, etc. Thus, EVOH resins have conventionally been utilized as films or sheets, such as food packaging materials, medicine packaging materials, industrial-chemical packaging materials, and agricultural-chemical packaging materials, or as molded containers such as tubes, cups, trays, and bottles, so as to take advantage of those properties.

A technique in which a modified EVOH resin that comprises a structural unit having a 1,2-diol at its side chain, which is represented by the following general formula (α), is used in order to improve the melt moldability of EVOH resins is known (see, for example, patent document 1).

[Chem. 1]

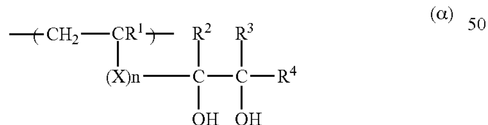

(α)

[In the formula, X is any bonding chain other than the ether bond; $R^1$ to $R^4$ each independently are any substituent; and n represents 0 or 1.]

Meanwhile, a technique is known in which an EVOH resin composition, obtained by mixing two or more EVOH resins differing in ethylene content, saponification degree, etc. is used for molded products in order to improve the gas barrier properties and melt moldability of EVOH resins. As application of this technique to that technique described above, a technique in which an unmodified EVOH resin is blended with the modified EVOH resin has been proposed (see, for example, patent document 2).

According to this technique, when a layer of the resin composition is laminated to a polyolefin resin layer, a laminate which is reduced in neck-in even when produced through high-speed film formation and which has excellent stretchability and has stable gas barrier properties after stretching can be obtained.

Since EVOH resins are generally used mainly in melt molding, it is preferred that the EVOH resins should be evenly melted by heat and should evenly solidify after molding. However, in techniques in which different EVOH resins are mixed together as described above, the EVOH resins used are different from each other in ethylene content, saponification degree, the kind of modifying group, modification amount, etc. and, hence, the melting points of the EVOH resins differ as a matter of course. Consequently, when such a composition is melt-molded, the components have insufficient compatibility because of the uneven meltability thereof, and there is a tendency that phase separation occurs because the components differ in the rate of solidification. There has hence been a problem that thickness unevenness or streaks occur in molded products obtained from the EVOH resin composition.

As a technique for overcoming that problem, there is a method in which a modified EVOH resin and a normal EVOH resin are separately produced, in which the ethylene content, degree of saponification, and degree of modification of the modified EVOH resin are regulated in advance so as to reduce the melting peak difference between the EVOH resins, and these EVOH resins are then mixed together. In this method, however, the individual resins must be separately manufactured and this tends to impair productivity.

When resins which each have not undergone solvolysis are mixed together and solvolyzed at the same time, this method tends to attain better productivity and result in melting peaks having a reduced difference. However, the melting peak difference is still large, and there has been room for improvement from the standpoint of completely eliminating thickness and streaks in melt-molded products.

DOCUMENTS

Patent Documents

Patent Document 1: JP-A-2004-359965 (US 2007-0178268)
Patent Document 2: JP-A-2006-124668 (US 2007-0196679)

SUMMARY OF THE INVENTION

Problems that the Invention is to Solve

An object of the invention is to provide an EVOH resin composition which comprises a modified EVOH resin containing a structural unit having a 1,2-diol at its side chain and a different EVOH resin and which has an exceedingly reduced melting peak difference imparted thereto through a simple step and has excellent melt moldability.

Means for Solving the Problems

In view of the circumstances described above, the present inventors diligently made investigations. As a result, it has been found that when the ethylene content of a modified ethylene-vinyl ester copolymer (hereinafter "ethylene-vinyl ester copolymer" is often abbreviated to EVE resin) (B') is made equal to or higher than the ethylene content of an EVE resin (A'), and the blending ratio by weight of (B') is made equal to or smaller than that of (A'), then the EVOH resin composition has a reduced melting peak difference. The invention has been thus completed.

That is, a summary of the invention is shown below.

In an aspect, the invention comprises a process for manufacturing a composition of a solvolysis product of an ethylene-vinyl ester copolymer, which comprises:

conducting solvolysis of an ethylene-vinyl ester copolymer (A') and a modified ethylene-vinyl ester copolymer (B') comprising a structural unit derived from a compound represented by the general formula (2) in one system to manufacture the composition of a solvolysis product of an ethylene-vinyl ester copolymer comprising a solvolysis product (A) of the ethylene-vinyl ester copolymer and a solvolysis product (B) of the modified ethylene-vinyl ester copolymer comprising a structural unit represented by the general formula (1), wherein a ratio of an ethylene content (B')/(A') of the ethylene-vinyl ester copolymer (A') and the modified ethylene-vinyl ester copolymer (B') in the step of conducting solvolysis is 1 or more, and a blending ratio (B')/(A') of the ethylene-vinyl ester copolymer (A') and the modified ethylene-vinyl ester copolymer (B') is from 50/50 to 1/99 by weight ratio:

[Chem. 2]

(1)

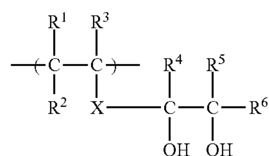

wherein $R^1$, $R^2$ and $R^3$ each independently represent a hydrogen atom or an organic group, X represents a single bond or a bonding chain, and $R^4$, $R^5$ and $R^6$ each independently represent a hydrogen atom or an organic group; and

[Chem. 3]

(2)

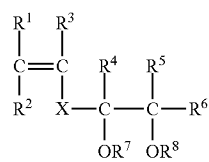

wherein $R^1$, $R^2$ and $R^3$ each independently represent a hydrogen atom or an organic group, X represents a single bond or a bonding chain, $R^4$, $R^5$ and $R^6$ each independently represent a hydrogen atom or an organic group, $R^7$ and $R^8$ each independently represent a hydrogen atom, a hydrocarbon group or $R^9$—CO— (wherein $R^9$ represents an alkyl group), $R^7$ and $R^8$ may bond to form a five-membered ring and the five-membered ring represents a cyclic carbonate structure or a cyclic acetal structure.

The invention also comprises a process for manufacturing a composition of a solvolysis product of an ethylene-vinyl ester copolymer, wherein the modified ethylene-vinyl ester copolymer (B') comprises the structural unit derived from a compound represented by the general formula (2) in an amount of 0.1 to 30 mol %.

In aspects, a difference (B')−(A') in the ethylene content between the ethylene-vinyl ester copolymer (A') and the modified ethylene-vinyl ester copolymer (B') can be from 0.1 to 40 mol %.

In aspects, the ethylene-vinyl ester copolymer (A') and the modified ethylene-vinyl ester copolymer (B') can have the ethylene content of 20 to 60 mol %.

In aspects, the composition of a solvolysis product of an ethylene-vinyl ester copolymer can have a single peak, or can have a difference of melting peak of 20° C. or less between the highest-temperature melting peak and the lowest-temperature melting peak when the composition has two or more melting peaks.

In aspects, the composition of a solvolysis product of an ethylene-vinyl ester copolymer can have an average degree of solvolysis of 90 to 100 mol %.

In aspects, the composition of a solvolysis product of an ethylene-vinyl ester copolymer can have an MFR of 1 to 120 g/10 min as a value measured at 210° C. under a load of 2160 g.

In aspects, X can represent a single bond or a hydrocarbon chain having 1 to 6 carbon atoms in the structural unit represented by the general formula (1) and the compound represented by the general formula (2).

In aspects, the compound represented by the general formula (2) can be a compound represented by the following general formula (2a):

[Chem. 4]

(2a)

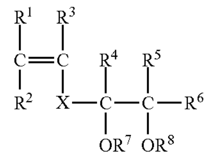

wherein $R^1$, $R^2$ and $R^3$ each independently represent a hydrogen atom or an organic group, X represents a single bond or a bonding chain, $R^4$, $R^5$ and $R^6$ each independently represent a hydrogen atom or an organic group, and $R^7$ and $R^8$ each independently represent a hydrogen atom or $R^9$—CO— (wherein $R^9$ represents an alkyl group).

In aspects, the structural unit represented by the general formula (1) can be a structural unit represented by the following general formula (1a), and the compound represented by the general formula (2) is 3,4-diacyloxy-1-butene.

[Chem. 5]

(1a)

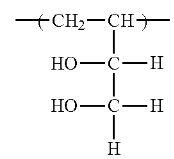

In aspects, the compound represented by the general formula (2) can be 3,4-diacetoxy-1-butene.

In aspects, $R^1$ to $R^3$ each independently can represent an alkyl group having 1 to 4 carbon atoms or a hydrogen atom, and $R^4$ to $R^6$ each independently represent an alkyl group having 1 to 4 carbon atoms or a hydrogen atom in the structural unit represented by the general formula (1) and the compound represented by the general formula (2).

In aspects, the solvolysis can be conducted under a basic condition.

In aspects, the solvolysis is conducted in an alcohol or a mixed solvent of water/alcohol.

Advantages of the Invention

In some aspects of the invention, when an EVOH resin composition is manufactured by conducting solvolysis of an EVE resin (A') and a modified EVE resin (B') containing a structural unit derived from a compound represented by the general formula (2) in one system while regulating the ratio (B')/(A') between the ethylene content of the EVE resin (A') and the ethylene content of the modified EVE resin (B') to 1 or more and further regulating the blending ratio (B')/(A') to 50/50 to 1/99 in terms of weight ratio, then this process brings about an unexpected effect that the EVOH resin composition obtained has an exceedingly reduced melting peak difference and has improved productivity and melt moldability.

BRIEF DESCRIPTION OF THE DRAWINGS

A non-limiting feature of the present invention is further described in the detailed description which follows, in reference to the noted plurality of drawings by way of non-limiting examples of exemplary embodiments of the present invention, in which like reference numerals represent similar parts throughout the several views of the drawings, and wherein.

MODES FOR CARRYING OUT THE INVENTION

Figure 1:
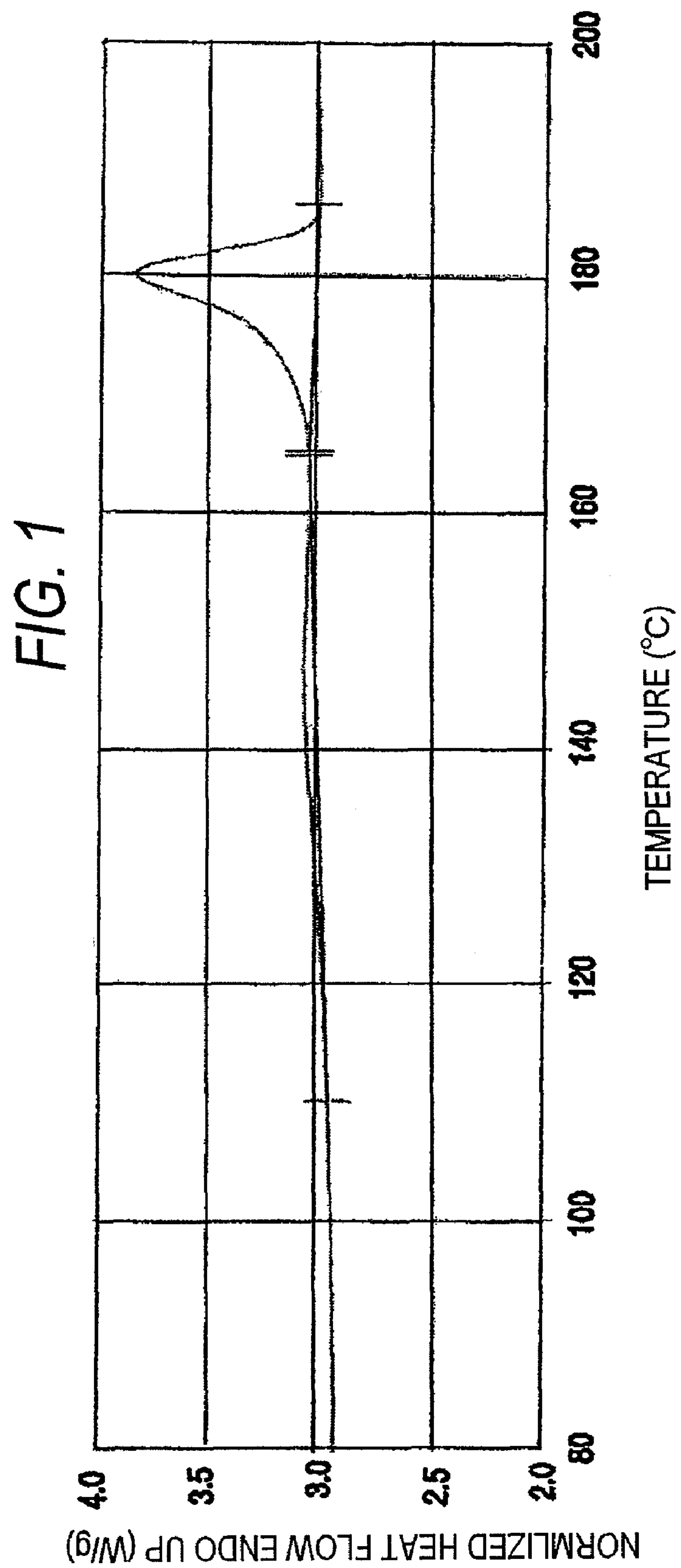
FIG. 1 shows a melting peak of an EVOH resin composition in Example 1.

Constitutions of the invention will be described in detail below, but these are intended to show an example of desirable embodiments.

The invention relates to a process for manufacturing an EVOH resin composition comprising: conducting solvolysis of an EVE resin (A') and a modified EVE resin (B') containing a structural unit derived from a compound represented by the general formula (2) in one system; and manufacturing the EVOH resin composition comprising an EVOH resin (A) and a modified EVOH resin (B) comprising a structural unit represented by the general formula (1), wherein in the step of solvolysis, the ethylene content ratio (B')/(A') of the EVE resin (A') and the modified EVE resin (B') is 1 or more and the blending ratio (B')/(A') is from 50/50 to 1/99 by weight.

[Chem. 6]

(1)

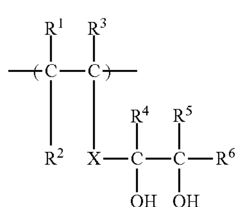

wherein $R^1$, $R^2$ and $R^3$ each independently represent a hydrogen atom or an organic group, X represents a single bond or a bonding chain, and $R^4$, $R^5$ and $R^6$ each independently represent a hydrogen atom or an organic group, and

[Chem. 7]

(2)

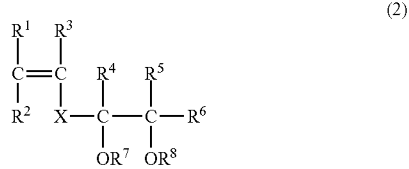

wherein $R^1$, $R^2$ and $R^3$ each independently represent a hydrogen atom or an organic group, X represents a single bond or a bonding chain, $R^4$, $R^5$ and $R^6$ each independently represent a hydrogen atom or an organic group, $R^7$ and $R^8$ each independently represent a hydrogen atom, a hydrocarbon group or $R^9$—CO— (wherein $R^9$ represents an alkyl group), $R^7$ and $R^8$ may bond to form a five-membered ring and the five-membered ring represents a cyclic carbonate structure or a cyclic acetal structure.

Incidentally, the following general formula (3) is an example of a compound in which $R^7$ and $R^8$ bond to form a five-membered ring and the five-membered ring represents a cyclic carbonate structure in the general formula (2), and the following general formula (4) is an example of a compound in which $R^7$ and $R^8$ bond to form a five-membered ring and the five-membered ring represents a cyclic acetal structure in the general formula (2):

[Chem. 8]

(3)

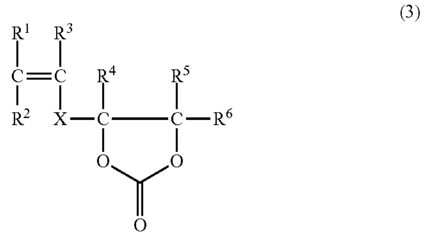

[Chem. 9]

(4)

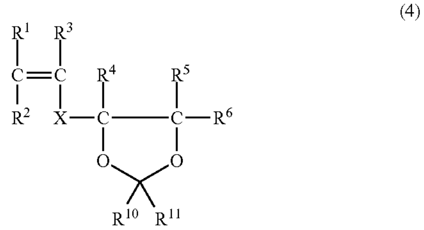

wherein $R^{10}$ and $R^{11}$ each independently represent a hydrogen atom or a hydrocarbon group.

<Description of EVE Resin (A') and EVOH Resin (A)>

The EVOH resin (A) in the invention is a resin obtained by copolymerizing ethylene and a vinyl ester-based monomer to obtain an ethylene-vinyl ester copolymer (hereinafter often referred to as an EVE resin) (A') and then conducting solvolysis the EVE resin (A'). This resin is a water-insoluble thermoplastic resin. The resin is generally used as, for example, films for food packaging and the like. The EVE resin (A') is produced by any known polymerization method such as, for example, solution polymerization, suspension polymerization, or emulsion polymerization.

Vinyl acetate is representatively used as the vinyl ester-based monomer. However, this is only representative and those of ordinary skill in the art will readily understand that any compatible vinyl ester-based monomer or starting material could readily be employed. In some cases, examples of the monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate and aromatic vinyl esters such as vinyl benzoate. They are generally aliphatic vinyl esters having usually 3 to 20 carbon atoms, preferably 4 to 10 carbon atoms, especially preferably 4 to 7 carbon atoms. These vinyl ester-based monomers are generally used alone, but two or more thereof may be simultaneously used according to need.

In particular, an ethylene-vinyl acetate copolymer is referred to as an EVA resin.

The ethylene content of the EVE resin (A') and that of the EVOH resin (A) have the same value because the ethylene content of the EVE resin (A') does not change through the solvolysis. The ethylene content thereof is usually from 20 to 60 mol %, preferably from 30 to 50 mol %, especially preferably from 30 to 40 mol %, in terms of the value determined on the basis of ISO14663. In case where the content thereof is too low, melt moldability tends to be insufficient. Conversely, in case where the content thereof is too high, gas barrier properties tend to be insufficient.

In the EVE resin (A'), the portion other than structural units derived from ethylene is constituted of structural units derived from a vinyl ester or any of the other copolymerizable ingredients which will be described later.

In the EVOH resin (A), the portion other than structural units derived from ethylene is constituted of vinyl alcohol structural units formed by the solvolysis of vinyl ester-derived structural units, and of a small amount of vinyl ester-derived structural units remaining after the solvolysis or structural units derived from any of the other copolymerizable ingredients which will be described later. The content of the vinyl alcohol structural units in the EVOH resin (A) is usually from 40 to 80 mol %, preferably from 50 to 70 mol %, especially preferably from 60 to 70 mol %.

The paste viscosity of the EVE resin (A') is usually from $10^1$ to $10^5$ mPa·s, preferably from $10^2$ to $10^4$ mPa·s, especially preferably from $10^2$ to $10^3$ mPa·s, in terms of the viscosity of a paste thereof prepared with methanol solvent and having a resin content of 40% by weight, as measured with a B-type viscometer (rotor No. 2; rotation speed, 10 rpm; paste temperature, 65° C.). In case where the value thereof is too high or too low, compatibility with the modified EVE resin (B'), which will be described later, tends to be poor.

The viscosity of the EVE resin (A') paste having a given resin content is a value corresponding to the degree of polymerization of the EVE resin (A'). When the degree of polymerization of the EVE resin (A') is high, the viscosity tends to be high. When the degree of polymerization thereof is low, the viscosity tends to be low.

<Description of Modified EVE Resin (B') and Modified EVOH Resin (B)>

The modified EVOH resin (B) comprising a structural unit represented by the general formula (1), which is used in the invention, is explained.

[Chem. 10]

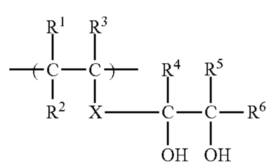

wherein $R^1$, $R^2$ and $R^3$ each independently represent a hydrogen atom or an organic group, X represents a single bond or a bonding chain, and $R^4$, $R^5$ and $R^6$ each independently represent a hydrogen atom or an organic group.

Such a resin is a resin obtained by conducting solvolysis of the modified EVE resin (B') obtained by copolymerization of ethylene, vinyl eater-based monomer and the compound represented by the general formula (2):

[Chem. 11]

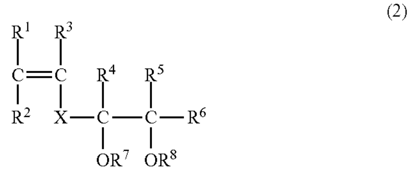

wherein $R^1$, $R^2$ and $R^3$ each independently represent a hydrogen atom or an organic group, X represents a single bond or a bonding chain, $R^4$, $R^5$ and $R^6$ each independently represent a hydrogen atom or an organic group, $R^7$ and $R^8$ each independently represent a hydrogen atom, a hydrocarbon group or $R^9$—CO— (wherein $R^9$ is an alkyl group), $R^7$ and $R^8$ may bond to form a five-membered ring, and the five-membered ring represents a cyclic carbonate structure or a cyclic acetal structure.

The compound represented by the general formula (2) is a compound as follows. When this compound is copolymerized with ethylene and a vinyl ester-based monomer and the resulting copolymer is solvolyzed, then structural units of the compound represented by the general formula (2) are solvolyzed under the same conditions as for the solvolysis of structural units derived from the vinyl ester-based monomer to thereby give structural units represented by the general formula (1).

This resin can be manufactured, for example, by the method described in JP-A-2004-359965, which is hereby incorporated by reference herein in its entirety.

Incidentally, as described above, the following general formula (3) is an example of a compound in which $R^7$ and $R^8$ bond to form a five-membered ring and the five-membered ring represents the cyclic carbonate structure in the general formula (2), and the following general formula (4) is an example of a compound in which $R^7$ and $R^8$ bond to form a five-membered ring and the five-membered ring represents the cyclic acetal structure in the general formula (2):

[Chem. 12]

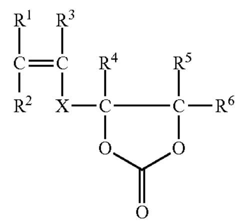

[Chem. 13]

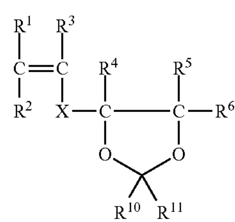

wherein $R^{10}$ and $R^{11}$ each independently represent a hydrogen atom or a hydrocarbon group.

It is preferred to use a compound represented by the following general formula (2a) among the compounds represented by the general formula (2), from the standpoints that the structure of this compound is analogous to that of the EVE resin (A') and hence has a high affinity for the EVE resin (A') to attain an excellent mixing efficiency, and that impurities resulting from production are analogous to the EVE resin (A') and, hence, that compound has excellent industrial productivity.

[Chem. 14]

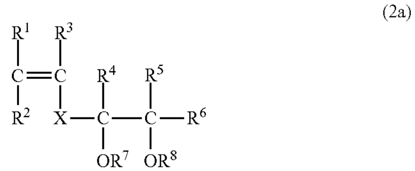

wherein $R^7$ and $R^8$ each independently represent a hydrogen atom or $R^9$—CO— (wherein $R^9$ represents an alkyl group).

In the above-mentioned general formula (2a), $R^1$ to $R^6$ have the same meanings as in the above-mentioned general formula (1). $R^7$ and $R^8$ are each preferably $R^9$—CO—. $R^9$ usually represents an alkyl group having 1 to 20 carbon atoms, preferably an alkyl group having 1 to 10 carbon atoms from industrial productivity, particularly preferably an alkyl group having 1 to 5 carbon atoms and more particularly preferably a methyl group.

Namely, specific examples of the compound represented by the general formula (2a) generally include 3,4-diol-1-butene, 3,4-diacyloxy-1-butene, 3-acyloxy-4-ol-1-buten, 4-acyloxy-3-ol-1-buten, and 3,4-diacyloxy-2-methyl-1-butene. Preferred are 3,4-diol-1-butene, 3,4-diacetoxy-1-butene, 3-acetoxy-4-ol-1-buten, 4-acetoxy-3-ol-1-buten, and 3,4-diacetoxy-2-methyl-1-butene. Especially preferred is 3,4-diacetoxy-1-butene.

As the vinyl ester-based monomer, use may be made of the same vinyl ester-based monomer as in the EVE resin (A') and EVOH resin (A), and it is generally an aliphatic vinyl ester having usually 3 to 20 carbon atoms, preferably 4 to 10 carbon atoms, especially preferably 4 to 7 carbon atoms. From the standpoint of profitability, it is especially preferred to use vinyl acetate. Those vinyl ester-based monomers are generally used alone, but two or more thereof may be simultaneously used according to need.

It is preferred that $R^1$ to $R^6$ in the 1,2-diol structural unit represented by the general formula (1) should all be hydrogen atoms.

In the case where $R^1$ to $R^6$ are organic groups, $R^1$ to $R^3$ each independently are a hydrocarbon group having usually 1 to 30 carbon atoms, more preferably 1 to 15 carbon atoms, even more preferably 1 to 4 carbon atoms. $R^4$ to $R^6$ each independently are a hydrocarbon group having usually 1 to 30 carbon atoms, more preferably 1 to 15 carbon atoms, even more preferably 1 to 4 carbon atoms.

Specific examples include alkyl groups such as methyl group, ethyl group, n-propyl group, isopropyl group, n-butyl group, isobutyl group, and tert-butyl group, aromatic hydrocarbon groups such as phenyl group and benzyl group, halogen atom, hydroxyl group, acyloxy group, alkoxycarbonyl group, carboxyl group, and sulfonic acid group.

Namely, $R^1$ to $R^3$ each independently are usually an alkyl group having 1 to 30 carbon atoms or a hydrogen atom, more preferably an alkyl group having 1 to 15 carbon atoms or a hydrogen atom, even more preferably an alkyl group having 1 to 4 carbon atoms or a hydrogen atom, and most preferably a hydrogen atom. $R^4$ to $R^6$ each independently are usually an alkyl group having 1 to 30 carbon atoms or a hydrogen atom, more preferably an alkyl group having 1 to 15 carbon atoms or a hydrogen atom, even more preferably an alkyl group having 1 to 4 carbon atoms or a hydrogen atom, and most preferably a hydrogen atom. In particular, it is most preferred that $R^1$ to $R^6$ should all be hydrogen atoms.

Incidentally, the explanation given above on $R^1$ to $R^6$ applies also to the $R^1$ to $R^6$ included in the general formula (2).

X in the structural unit represented by the general formula (1) preferably is a short bonding chain, and most preferably is a single bond, from the standpoint of enabling to retain crystallinity and have excellent gas barrier properties.

Incidentally, it may be a bonding chain within the range not inhibiting the advantages of the invention. Such bonding chains include, but are not limited to, ether bond site-containing structures such as —O—, —$(CH_2O)_m$—, —$(OCH_2)_m$— and —$(CH_2O)_mCH_2$—, carbonyl group-containing structures such as —CO—, —COCO—, —$CO(CH_2)_mCO$— and —$CO(C_6H_4)CO$—, heteroatom-containing structures such as sulfur atom-containing structures such as —S—, —CS—, —SO— and —$SO_2$—, nitrogen atom-containing structures such as —NR—, —CONR—, —NRCO—, —CSNR—, —NRCS— and —NRNR—, and phosphorus atom-containing structures such as —$HPO_4$—, and metal atom-containing structures such as silicon atom-containing structures such as —$Si(OR)_2$—, —$OSi(OR)_2$— and —$OSi(OR)_2O$—, titanium atom-containing structures such as —$Ti(OR)_2$—, —$OTi(OR)_2$— and —$OTi(OR)_2O$— and aluminum atom-containing structures such as —Al(OR)—, —OAl(OR)— and —OAl(OR)O— (wherein R each independently represent an arbitrary substituent, preferably a hydrogen atom or an alkyl group, and m is a counting number, and usually from 1 to 30, preferably from 1 to 15, more preferably from 1 to 10). Preferred of these from the standpoint of stability during production or use are —$CH_2OCH_2$— and hydrocarbon chains having 1 to 10 carbon atoms. More preferred are hydrocarbon chains having 1 to 6 carbon atoms. Especially preferred is the hydrocarbon chain having one carbon atom.

The explanation given above on $R^1$ to $R^6$ applies also equally and fully to the $R^1$ to $R^6$ in the general formula (2).

The most preferred structure in the 1,2-diol structural unit represented by the above-mentioned general formula (1) is one in which all of $R^1$ to $R^6$ are hydrogen atoms and X is a single bond. That is to say, most preferred is a structural unit represented by the following general formula (1a):

[Chem. 15]

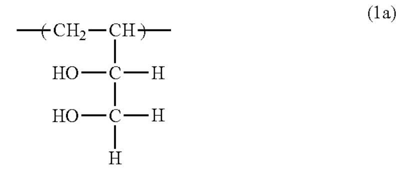

The structural units possessed by the EVE resin (B'), which is a polymer to be solvolyzed to give the EVOH resin (B), are explained below.

[i] Structural Unit Derived from Compound Represented by General Formula (2)

A structural unit represented by the following general formula (2-1) is a structural unit derived from a compound represented by the general formula (2).

[Chem. 16]

(2-1)

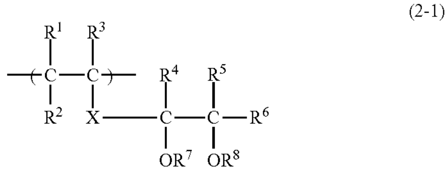

wherein $R^7$ and $R^8$ each independently represent a hydrogen atom, a hydrocarbon group or $R^9$—CO— (wherein $R^9$ represents an alkyl group), $R^7$ and $R^8$ may bond to form a five-membered ring and the five-membered ring represents a cyclic carbonate structure or a cyclic acetal structure.

In the general formula (2-1), $R^1$ to $R^6$ have the same meanings as in the general formula (1).

[ii] Structural Unit Derived from Compound Represented by General Formula (3)

A structural unit represented by the following general formula (3-1) is the structural unit derived from the compound represented by the general formula (3). Incidentally, the general formula (3) shows an example of a compound in which $R^7$ and $R^8$ bond to form a five-membered ring and the five-membered ring represents a cyclic carbonate structure in the general formula (2).

[Chem. 17]

(3-1)

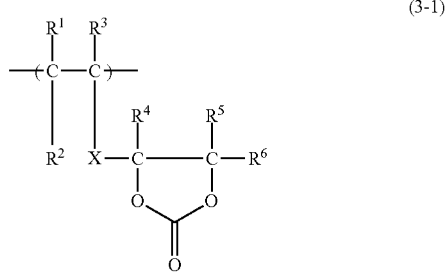

In the above-mentioned general formula (3-1), $R^1$ to $R^6$ have the same meanings as in the above-mentioned general formula (1).

[iii] Structural Unit Derived from Compound Represented by General Formula (4)

A structural unit represented by the following general formula (4-1) is the structural unit derived from the compound represented by the general formula (4). Incidentally, the general formula (4) shows an example of a compound in which $R^7$ and $R^8$ bond to form a five-membered ring and the five-membered ring represents a cyclic acetal structure in the general formula (2).

[Chem. 18]

(4-1)

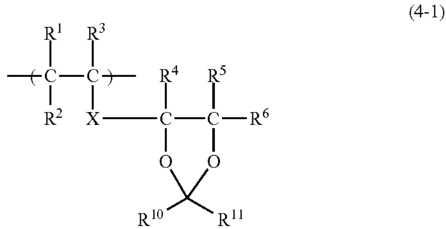

wherein $R^{10}$ and $R^{11}$ each independently represent a hydrogen atom or a hydrocarbon group.

In the above-mentioned general formula (4-1), $R^1$ to $R^6$ have the same meanings as in the above-mentioned general formula (1). $R^{10}$ and $R^{11}$ usually represent an alkyl group having 1 to 20 carbon atoms, preferably an alkyl group 1 to 10 carbon atoms from the standpoint of productivity, particularly preferably an alkyl group having 1 to 5 carbon atoms and more particularly preferably a methyl group.

Further, as an example, and taking for example the modified EVOH resin comprising the structural unit (1a) which is the most preferred structure, manufacturing processes thereof include [1] a process of using as the comonomer 3,4-diol-1-butene, 3,4-diacyloxy-1-butene, 3-acyloxy-4-ol-1-butene, 4-acyloxy-3-ol-1-butene, 3,4-diacyloxy-2-methyl-1-butene or the like as shown in the general formula (2a), and copolymerizing the vinyl ester-based monomer and ethylene therewith to obtain the copolymer, followed by conducting solvolysis thereof, [2] a process of using as the comonomer vinyl ethylene carbonate or the like as shown in the general formula (3), and copolymerizing the vinyl ester-based monomer and ethylene therewith to obtain the copolymer, followed by conducting solvolysis and decarboxylation thereof, [3] a process of using as the comonomer 2,2-dialkyl-4-vinyl-1,3-dioxolane or the like as shown in the general formula (4), and copolymerizing the vinyl ester-based monomer and ethylene therewith to obtain the copolymer, followed by conducting solvolysis and solvolysis of acetal structure, and the like.

Of the above, the manufacturing process of [1] described above is preferably employed because of an advantage at the time of manufacturing that polymerization sufficiently proceeds to easily uniformly introduce the 1,2-diol structure unit into a polymer chain, and because the unreacted monomer is reduced, thereby being able to decrease impurities in the product. In terms of excellent copolymerization reactivity, the method of solvolyzing the copolymer obtained by copolymerizing 3,4-diacyloxy-1-butene with the vinyl ester-based monomer and ethylene is particularly preferred. Further, it is preferred to use 3,4-diacetoxy-1-butene as 3,4-diacyloxy-1butene. Furthermore, a mixture of the monomers exemplified in the manufacturing process of [1] described above may be used.

Incidentally, the reactivity ratios of the respective monomers at the time when vinyl acetate is used as the vinyl ester-based monomer and 3,4-diacetoxy-1-butene is copolymerized therewith are r(vinyl acetate)=0.710 and r(3,4-diacetoxy-1-butene)=0.701. This shows that 3,4-diacetoxy-1-butene is excellent in copolymerization reactivity with vinyl acetate, compared to r(vinyl acetate)=0.85 and r(vinyl ethylene carbonate)=5.4 in the case of vinyl ethylene carbonate described later.

Further, the chain transfer constant of 3,4-diacetoxy-1-butene is Cx(3,4-diacetoxy-1-butene)=0.003 (65° C.). This shows that it does not happen to become a disincentive to polymerization to make it difficult to increase the degree of polymerization or to cause a decrease in the polymerization rate, compared to Cx(vinyl ethylene carbonate)=0.005 (65° C.) for vinyl ethylene carbonate and Cx(2,2-dimethyl-4-vinyl-1,3-dioxolane)=0.023 (65° C.) for 2,2-dimethyl-4-vinyl-1,3-dioxolane.

Furthermore in such 3,4-diacetoxy-1-butene, a by-product generated when the copolymer thereof is solvolyzed is the same as one derived from the vinyl acetate structural unit which is the main structural unit, so that it is unnecessary to provide a special apparatus or process for post-treatment thereof. This is also an industrially great advantage. In addition, 3,4-diacetoxy-1-butene may contain 3,4-diacetoxy-1- butane, 1,4-diacetoxy-1-butene, 1,4-diacetoxy-1-butane and the like as small amounts of impurities.

Incidentally, 3,4-diol-1-butene is available from Eastman Chemical Company, and 3,4-diacetoxy-1-butene for industrial production is available from Eastman Chemical Company and a product of Acros at the reagent level is available from the market. Further, it is also possible to utilize 3,4-diacetoxy-1-butene obtained as a by-product during a process for manufacturing 1,4-butandiol.

In the modified EVOH resin comprising the 1,2-diol structural unit, which is manufactured by the manufacturing process [2] described above, carbonate rings remain in side chains in the case of low degree of saponification or insufficient decarboxylation, and are decarboxylated at the time of melt molding, which tends to cause foaming of the resin. Further, similarly in the modified EVOH resin comprising the 1,2-diol structural unit, which is manufactured by the manufacturing process [2] described above, also in the modified EVOH resin comprising the 1,2-diol structural unit, which is manufactured by the manufacturing process [3] described above, monomer-derived functional groups (acetal rings) remaining in side chains are eliminated at the time of melt molding to tend to generate an odor. It is therefore necessary to use, taking this in mind.

The content of the structural unit represented by the general formula (1) in the modified EVOH resin (B) is usually from 0.1 to 30 mol %, preferably from 0.5 to 15 mol %, especially preferably from 1 to 8 mol %, in terms of the value determined using $^1$H-NMR by the method described in JP-A-2004-359965. In case where the content thereof is too low, the EVOH resin composition tends to have poor melt moldability. In case where the content thereof is too high, molded products tend to have reduced gas barrier properties.

The copolymerization ratio of the compound represented by the general formula (2) in the modified EVE resin (B') corresponds to the content of the structural unit represented by the general formula (1) in the modified EVOH resin (B). Accordingly, the copolymerization ratio thereof is usually from 0.1 to 30 mol %, preferably from 0.5 to 15 mol %, especially preferably from 1 to 8 mol %. The content thereof can be regulated by changing monomer feed amounts.

The ethylene content of the modified EVE resin (B') and that of the modified EVOH resin (B) have the same value because the ethylene content of the modified EVE resin (B') does not change through the solvolysis. The ethylene content thereof is usually from 20 to 60 mol %, preferably from 25 to 50 mol %, especially preferably from 30 to 40 mol %, in terms of the value determined on the basis of ISO 14663. In case where the content thereof is too low, the melt moldability of the EVOH resin tends to be insufficient. Conversely, in case where the content thereof is too high, the gas barrier properties of the EVOH resin tend to be insufficient.

In the modified EVE resin (B'), the portion other than the structural units derived from ethylene and structural units derived from the compound represented by the general formula (2) is constituted of structural units derived from a vinyl ester or any of the other copolymerizable ingredients which will be described later. Consequently, the vinyl ester content of the modified EVE resin (B') is usually from 10 to 79.9 mol %, preferably from 35 to 74.5 mol %, especially preferably from 52 to 69 mol %.

In the modified EVOH resin (B), the portion other than the structural units of ethylene is constituted of vinyl alcohol structural units formed by the solvolysis of vinyl ester moieties, and of a small amount of vinyl ester structural units remaining after the solvolysis or structural units derived from any of the other copolymerizable ingredients which will be described later. The vinyl alcohol content of the EVOH resin (B) is usually from 10 to 79.9 mol %, preferably from 35 to 74.5 mol %, especially preferably from 52 to 69 mol %.

The paste viscosity of the modified EVE resin (B') is usually from $10^1$ to $10^5$ mPa·s, preferably from $10^2$ to $10^4$ mPa·s, especially preferably from $10^2$ to $10^3$ mPa·s, in terms of the viscosity of a paste thereof prepared with methanol solvent and having a resin content of 40% by weight, as measured with a B-type viscometer (rotor No. 2; rotation speed, 10 rpm; paste temperature, 65° C.). In case where the value thereof is too high or too low, compatibility tends to be poor.

The viscosity of the EVE resin (B') paste having a given resin content is a value corresponding to the degree of polymerization of the EVE resin (B'). When the degree of polymerization of the EVE resin (B') is high, the viscosity tends to be high. When the degree of polymerization thereof is low, the viscosity tends to be low.

The EVOH resin (A) and the modified EVOH resin (B) may have structural units derived from, for example, a copolymerizable ethylenically unsaturated monomer in an amount of, for example, 10 mol % or less, unless these structural units lessen the advantages of the invention. (Namely, the EVE resin (A') and the modified EVE resin (B') also may have structural units derived from, for example, a copolymerizable ethylenically unsaturated monomer in an amount of, for example, 10 mol % or less, unless these structural units lessen the advantages of the invention.)

Examples of the monomer include olefins such as propylene, 1-butene, and isobutene; unsaturated acids such as acrylic acid, methacrylic acid, crotonic acid, phthalic acid (anhydride), maleic acid (anhydride), and itaconic acid (anhydride) or salts thereof or mono- or dialkyl esters thereof having 1 to 18 carbon atoms; acrylamides such as acrylamide, N-alkylacrylamides having 1 to 18 carbon atoms, N,N-dimethylacrylamide, 2-acrylamidopropanesulfonic acid or salts thereof, and acrylamidopropyldimethylamine or acid salts thereof or quaternary salts thereof; methacrylamides such as methacrylamide, N-alkylmethacrylamides having 1 to 18 carbon atoms, N,N-dimethylmethacrylamide, 2-methacrylamidopropanesulfonic acid or salts thereof, and methacrylamidopropyldimethylamine or acid salts thereof or quaternary salts thereof; N-vinylamides such as N-vinylpyrrolidone, N-vinylformamide, and N-vinylacetamide; vinyl cyanides such as acrylonitrile and methacrylonitrile; vinyl ethers such as alkyl vinyl ethers having 1 to 18 carbon atoms, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; halogenated allyl compounds such as allyl acetate and allyl chloride; allyl alcohols such as dimethoxyallyl alcohol; trimethyl-(3-acrylamido-3-dimethylpropyl)-ammonium chloride; and acrylamido-2-methylpropanesulfonic acid.

Further, the EVOH resin composition obtained by the manufacturing process of the invention may be subjected to a post-modification reaction such as urethanization, acetalization, cyanoethylation or oxyalkylenation, within the range not impairing the spirit of the invention.

In the invention, the ethylene content of the modified EVOH resin (B) (namely, the modified EVE resin (B')) is regulated so as to be equal to or higher than the ethylene content of the EVOH resin (A) (namely, the EVE resin (A')), and the EVE resin (A') and the modified EVE resin (B') are solvolyzed in one system while regulating the blending ratio by weight of the modified EVE resin (B') so as to be equal to or smaller than that of the EVE resin (A'). As a result, this regulation properly acts on the regulation of melting peak values, and an EVOH resin composition having an especially small melting peak difference is automatically obtained.

Consequently, in the manufacturing process of the invention, the production step is simplified and an EVOH resin composition having an especially small melting peak difference is automatically obtained.

Most characteristic features of the invention reside in that the ethylene content of the modified EVE resin (B') is equal to or higher than the ethylene content of the EVE resin (A') and that the blending ratio by weight of the modified EVE resin (B') is equal to or smaller than that of the EVE resin (A').

The ratio of the ethylene content (B')/(A') of the modified EVE resin (B') and EVE resin (A') is 1 or more, preferably from 1 to 20, more preferably from 1 to 10, especially preferably from more than 1 to 5.

In case where the ratio is too large, barrier properties tend to decrease. In case where the ratio is too small, the melt moldability of the EVOH resin composition tends to be insufficient.

The difference in ethylene content, (B')−(A'), is usually from 0.1 to 40 mol %, preferably from 0.1 to 30 mol %, more preferably from 1 to 10 mol %, especially preferably from 2 to 5 mol %.

In case where the difference therebetween is too large, compatibility tends to be poor. When the difference therebetween is within that range, there is a tendency that both of the melt moldability and barrier properties can be achieved to a high degree in the EVOH resin composition, while retaining compatibility.

With respect to the blending ratios of the EVE resin (A') and the modified EVE resin (B'), the weight ratio (B')/(A') is from 50/50 to 1/99 (by weight), preferably from 25/75 to 1/99 (by weight), especially preferably from 20/80 to 1/99 (by weight).

In case where the ratio is too large, barrier properties after solvolysis tend to decrease. In case where the ratio is too small, the EVOH resin composition obtained through solvolysis tends to have insufficient melt moldability.

Furthermore, the difference in viscosity measured with a B-type viscometer (rotor No. 2; rotation speed, 10 rpm; paste concentration, 40 wt %; methanol solvent; paste temperature, 65° C.) between the EVE resin (A') and the modified EVE resin (B') is usually from 0 to $10^5$ mPa·s, preferably from 0 to $10^4$ mPa·s, especially preferably from 0 to 2,000 mPa·s, from the standpoint of compatibility between the two resins. The smaller the difference in viscosity, the more the mixing efficiency tends to be better and the more the compatibility tends to be improved.

<Manufacturing Process>

In the process for manufacturing an EVOH resin composition of the invention, a mixture of the EVE resin (A') and the modified EVE resin (B') is solvolyzed in one system.

This solvolysis is conducted using an alkali catalyst or an acid catalyst while keeping the EVE resin (A') and the modified EVE resin (B') in the state of being dissolved in an alcohol or in a water/alcohol mixed solvent.

Examples of the alcohol usually include aliphatic alcohols having 1 to 4 carbon atoms. Preferred are methanol, ethanol, propanol, and tert-butanol. From the standpoint of profitability, methanol is especially preferred.

In the case of a water/alcohol mixed solvent, the weight ratio thereof is usually from 10/90 to 90/10, preferably from 20/80 to 80/20, especially preferably from 40/60 to 60/40.

The concentrations of a solution of the EVE resin (A') and a solution of the modified EVE resin (B') are suitably selected according to the viscosity of the system. The concentrations thereof are usually from 10 to 60% by weight (resin content), preferably from 25 to 50% by weight (resin content). The viscosity can be regulated with resin content; high resin contents tend to result in an increased viscosity, while low resin contents tend to result in a reduced viscosity.

Examples of methods for obtaining a mixed solution of the EVE resin (A') and the modified EVE resin (B') include (1) a method in which the two resins are dry-blended and dissolved in a common solvent, (2) a method in which the resins are dissolved in respective solvents and the respective resin solutions are mixed together, (3) a method in which one resin is dissolved in a solvent and the other resin is added thereto to be dissolved therein, followed by mixing, and (4) a method in which the two resins in a molten state are mixed together and then dissolved in a solvent. Of these, the method (2) is preferred from the standpoint of productivity. It is especially preferred that respective resin solutions resulting from polymerization should be used as they are.

Examples of the catalyst usable in the solvolysis include alkali catalysts, acid catalysts and the like. Specific examples of the alkali catalysts include alkali metal hydroxides such as sodium hydroxide and potassium hydroxide; and alkali metal alkoxides such as sodium methylate, sodium ethylate, potassium methylate, and lithium methylate. Examples of the acid catalysts include inorganic acids such as sulfuric acid, hydrochloric acid, and nitric acid; organic acids such as methanesulfonic acid; zeolites; and cation-exchange resins. From the standpoints of handleability and industrial productivity, alkali catalysts are preferred. Especially preferred are alkali metal hydroxides. Namely, it is preferred that the solvolysis in the invention should be conducted under basic conditions, in other words, the solvolysis should be saponification.

The amount of the solvolysis catalyst to be used may be suitably selected according to the method of solvolysis, the desired degree of solvolysis, etc. In the case of using an alkali catalyst, an appropriate amount thereof is usually from 0.001 to 100 mmol equivalents based on the amount of vinyl acetate.

The term "degree of solvolysis" as used herein means a value determined on the basis of JIS K6726 (using the EVOH resin composition in the form of a homogeneous solution in a water/methanol solvent). In particular, when the solvolysis is saponification, the degree of solvolysis is called the degree of saponification.

With regard to the method of such solvolysis, any of batch solvolysis, continuous solvolysis on a belt and tower type continuous solvolysis is possible depending on the desired degree of solvolysis and the like. For the reasons that the amount of the alkali catalyst at the time of solvolysis can be decreased and that the solvolysis reaction easily proceeds at high efficiency, the tower type solvolysis under constant pressure is preferably used. The pressure at the time of solvolysis is usually selected from the range of 2 to 7 kg/cm$^2$, although that kind of generalization cannot be made depending on the desired ethylene content. The temperature at this time is usually from 60 to 140° C., and the reaction is usually conducted for 0.5 to 6.0 hours.

A methanol solution of the EVOH resin composition solvolyzed as described above is solid-liquid separated by a known method, for example, a centrifugal separator or a method of extruding it in a coagulation bath. As a drying method, there can also be employed a known method, which includes fluidized drying conducted while being stirred and dispersed mechanically or by hot air, and ventilation drying conducted without dynamic actions such as stirring and dispersion. Driers for conducting the fluidized drying include a cylindrical agitated trough dryer, a circular tube dryer, a rotary dryer, a fluidized-bed dryer, a vibrating fluidized-bed dryer, a conical rotary dryer and the like. Further, dryers for conducting the ventilation drying include a batch-wise box type dryer as a material standing type, and a band dryer, a tunnel dryer, a vertical dryer and the like as a material transfer type. However, they are not limited thereto. It is also possible to use the fluidized drying and the ventilation drying in combination.

As a heating gas used at drying treatment, air or an inert gas (nitrogen gas, helium gas, argon gas, or the like) is usually used. The temperature of the heating gas is not particularly limited, and is preferably from 40 to 150° C. from the standpoints of productivity and prevention of thermal degradation of the EVOH resin composition. The time period of the drying treatment is usually preferably about from 15 minutes to 72 hours from the standpoints of productivity and prevention of thermal degradation, although it depends on the water content of the EVOH resin composition or on the amount of the composition to be treated.

The drying treatment is conducted under the conditions described above. The water content of the EVOH resin composition after the drying treatment is usually from 0.001 to 5% by weight, preferably from 0.01 to 2% by weight, especially preferably from 0.1 to 1% by weight.

The average ethylene content of the EVOH resin composition obtained by the manufacturing process of the invention is usually from 20 to 60 mol %, preferably from 25 to 50 mol %, especially preferably from 28 to 45 mol %, in terms of the value determined on the basis of ISO 14663. In case where the average ethylene content thereof is too low, the EVOH resin composition tends to have reduced melt moldability.

The average degree of solvolysis of the EVOH resin composition obtained by the manufacturing process of the invention is usually from 90 to 100 mol %, preferably from 95 to 100 mol %, especially preferably from 99 to 100 mol %, in terms of the value determined on the basis of JIS K6726 (using the EVOH resin composition in the form of a homogeneous solution in a water/methanol solvent). In case where the degree of solvolysis thereof is too low, gas barrier properties tend to be low.

The average content of structural units derived from the structural units (1) in the EVOH resin composition obtained by the manufacturing process of the invention is usually from 0.1 to 15 mol %, preferably from 0.1 to 15 mol %, especially preferably from 0.1 to 10 mol %, even more preferably from 0.5 to 8 mol %, in terms of the average content thereof based on the sum of the EVOH resin (A) and the modified EVOH resin (B) as determined by $^1$H-NMR on the basis of the method described in JP-A-2004-359965.

In case where the content thereof is too low, the EVOH resin composition tends to have poor melt moldability. In case where the content thereof is too high, molded products tend to have reduced gas barrier properties.

Further, the MFR of the EVOH resin composition obtained by the manufacturing process of the invention is usually from 1 to 120 g/10 min, preferably from 1 to 45 g/10 min, and particularly preferably from 3 to 25 g/10 min, as a value measured at 210° C. under a load of 2160 g.

The ratio of the EVOH resin (A) to the modified EVOH resin (B) in the EVOH resin composition obtained by the manufacturing process of the invention corresponds to the ratio of the EVE resin (A') to the modified EVE resin (B'). For example, the blending ratio (B)/(A) and the blending ratio (B')/(A') are usually from 50/50 to 1/99 (weight ratio), preferably from 25/75 to 1/99 (weight ratio), especially preferably from 20/80 to 1/99 (weight ratio).

The melting peak value of the resin composition obtained by the manufacturing process of the invention is obtained by measuring a second run obtained by measuring a main melting peak with a differential scanning calorimeter (DSC) at a rate of temperature increase of 5° C./min.

The EVOH resin composition obtained by the manufacturing process of the invention has a single melting peak or a plurality of melting peaks. When the composition has a plurality of melting peaks, the difference in temperature between the highest-temperature melting peak and the lowest-temperature melting peak is usually 20° C. or smaller, preferably 10° C. or smaller, especially preferably 0° (namely, the composition has only one melting peak).

In case where the value thereof is too large, compatibility between the EVOH resin (A) and the modified EVOH resin (B) tends to be poor.

Known compounding agents may be incorporated into the EVOH resin composition obtained by the manufacturing process of the invention, so long as the compounding agents do not defeat the object of the invention (for example, the compounding agents are incorporated in an amount of 10% by weight or less based on the EVOH resin). Examples of the compounding agents include heat stabilizers such as acids including acetic acid, phosphoric acid, and boric acid and water-soluble metal salts thereof, e.g., alkali metal salts, alkaline earth metal salts, and transition metal salts thereof; lubricants such as saturated aliphatic amides (e.g., stearic acid amide), unsaturated aliphatic amides (e.g., oleic amide), bis-fatty acid amides (e.g., ethylene bisstearic acid amide), low-molecular polyolefins (e.g., low-molecular polyethylene or low-molecular polypropylene having a molecular weight of about from 500 to 10,000); plasticizers such as aliphatic polyhydric alcohols, e.g., ethylene glycol, glycerin, and hexanediol; light stabilizers; antioxidants; drying agents; ultraviolet absorbers; coloring agents; antistatic agents; surfactants; antimicrobial agents; antiblocking agents; insoluble inorganic salts (e.g., hydrotalcite); fillers (e.g., inorganic fillers); oxygen absorbers; and resins other than EVOHs (e.g., polyolefins and polyamides).

In the invention, when an EVOH resin composition which is a mixture of the EVOH resin (A) and the modified EVOH resin (B) comprising structural units represented by the general formula (1) is to be obtained by subjecting the EVE resin (A') and modified EVE resin (B'), which are unsolvolyzed resins respectively corresponding to those two resins, to solvolysis in one system, the ethylene content of the modified EVE resin (B') is regulated so as to be equal to or higher than the ethylene content of the EVE resin (A') and the modified EVE resin (B') is incorporated in an amount equal to or smaller than the amount of the EVE resin (A'). Thus, an EVOH resin composition having an especially small melting peak difference is obtained, and an unexpected effect that productivity and the melt moldability of the EVOH resin composition are improved is obtained.

EXAMPLES

The invention will be explained below in more detail by reference to Examples, but the invention should not be construed as being limited to the following Examples unless the invention departs from the spirit thereof.

Incidentally, "parts" and "%" in the Examples are by weight unless otherwise indicated.

The ethylene content of each EVE resin was determined in accordance with ISO14663.

The viscosity of each EVE solution was measured with a B-type viscometer (rotor No. 2; rotation speed, 10 rpm; paste temperature, 65° C.).

The average degree of solvolysis of each EVOH resin was determined in accordance with JIS K6726 (using the EVOH resin in the form of a homogeneous solution in a water/methanol solvent).

The content of structural units with a 1,2-diol at its side chain in the modified EVOH resin (B') was determined using $^1$H-NMR by the method described in JP-A-2004-359965.

Melting peaks were measured through a second run in which melting peaks were determined with a differential scanning calorimeter (DSC) at a heating rate of 5° C./min.

The MFR of the EVOH resin composition obtained was measured at 210° C. under a load of 2,160 g.

Example 1

An ethylene-vinyl acetate copolymer resin (A1') having an ethylene content of 32 mol % and a viscosity of 7,700 mPa·s in terms of the viscosity of a methanol solution thereof having a resin content of 50% was used as an EVE resin (A'). A modified ethylene-vinyl acetate copolymer resin (B1') having a content of structural units derived from 3,4-diacetoxy-1-butene of 3 mol %, an ethylene content of 35 mol %, and a viscosity of 4,200 mPa·s in terms of the viscosity of a methanol solution thereof having a resin content of 46% was used as a modified EVE resin (B').

110 parts by weight of a methanol solution of the EVE resin (A1') (resin content, 50% by weight) was mixed with 118 parts by weight of a methanol solution of the modified EVE resin (B1') (resin content, 46% by weight) (the weight ratio (B')/(A') was 54/56, which gave a resin content weight ratio (B)/(A) of 50/50 after solvolysis). Subsequently, 40 parts by weight of an aqueous NaOH solution (NaOH concentration, 2% by weight) was added to the mixed resin solution, and the resins were solvolyzed at 80° C. for 1 hour to obtain an EVOH resin composition solution of a saponified resin of ethylene-vinyl acetate copolymer (A) and a saponified resin of modified ethylene-vinyl acetate copolymer (B). The resulting EVOH resin composition solution was immersed in a coagulation bath to cause precipitation. The precipitate was dried at 120° C. for 16 hours to obtain a solid EVOH resin composition.

The resulting EVOH resin composition had an average degree of solvolysis of 99.8 mol %, an MFR of 17.1 g/10 min, and an average content (mol %) of structural units (1a) of 1.5 mol %. This EVOH resin composition was examined for melting peak. As a result, it was ascertained to have a single peak at 180° C. FIG. 1 shows the melting peak of this EVOH resin composition.

Example 2

A solid EVOH resin composition was obtained in the same manner as in Example 1, except that 154 parts by weight of a methanol solution of the EVE resin (A1') (resin content, 50% by weight) was mixed with 70 parts by weight of a methanol solution of the modified EVE resin (B1') (resin content, 46% by weight) (the weight ratio (B')/(A') was 33/77, which gave a resin content weight ratio (B)/(A) of 30/70 after solvolysis).

Figure 2:
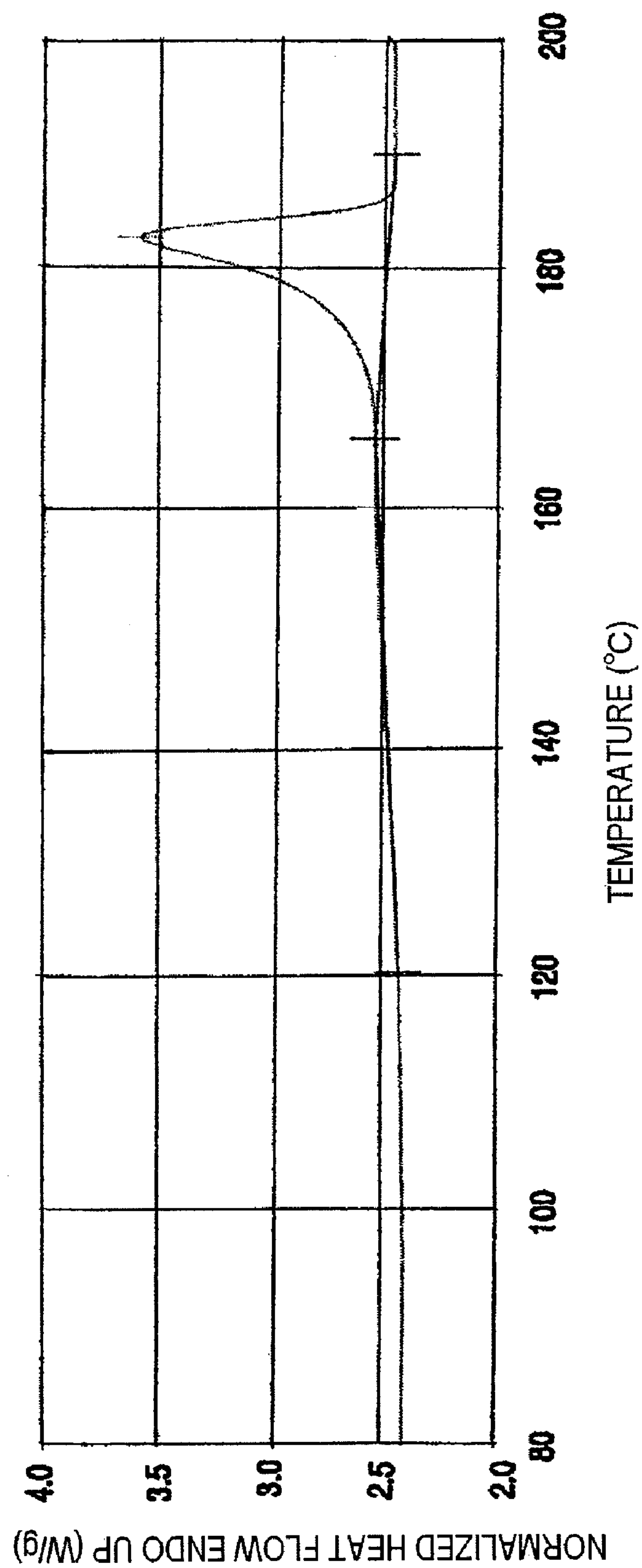
FIG. 2 shows a melting peak of an EVOH resin composition in Example 2.

The resulting EVOH resin composition had an average degree of solvolysis of 99.8 mol %, an MFR of 15.2 g/10 min, and an average content (mol %) of structural units (1a) of 1.0 mol %. This EVOH resin composition was examined for melting peak. As a result, it was ascertained to have a single peak at 183° C. FIG. 2 shows the melting peak of this EVOH resin composition.

Comparative Example 1

A solid EVOH resin composition was obtained in the same manner as in Example 1, except that 22 parts by weight of a methanol solution of the EVE resin (A1') (resin content, 50% by weight) was mixed with 214 parts by weight of a methanol solution of the modified EVE resin (B1') (resin content, 46% by weight) (the weight ratio (B')/(A') was 90/10, which gave a resin content weight ratio (B)/(A) of 90/10 after solvolysis).

Figure 3:
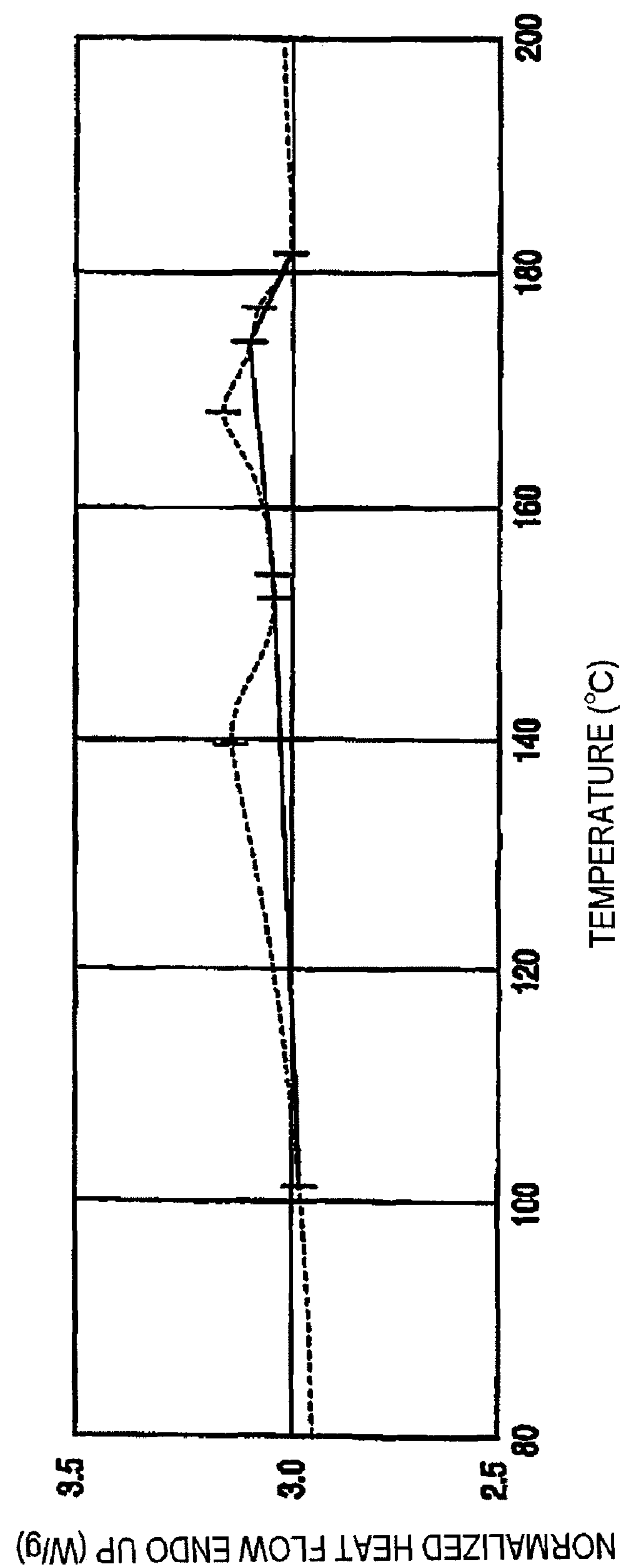
FIG. 3 shows a melting peak of an EVOH resin composition in Comparative Example 1.

The resulting EVOH resin composition had an average degree of solvolysis of 99.8 mol %, an MFR of 20.9 g/10 min, and an average content (mol %) of structural units (1a) of 2.7 mol %. This EVOH resin composition was examined for melting peak. As a result, peaks were observed respectively at 139° C. and 168° C. FIG. 3 shows the melting peaks of this EVOH resin composition.

The conditions and results in the Examples and Comparative Example are shown in Table 1.

TABLE 1

| | EVE resin (A') Ethylene content | EVE resin (B') 3,4-Diacetoxy-1-butene content | EVE resin (B') Ethylene content | Ethylene content ratio (B')/(A') of EVE resin (A') and EVE resin (B') | [EVOH resin (B)]/[EVOH resin (A)] (resin content weight ratio) | Average content of structural unit (1a) in EVOH resin composition obtained (mol %) | Average degree of solvolysis of EVOH resin composition obtained (mol %) | Melting peak temperature (Melting peak difference) |
|---|---|---|---|---|---|---|---|---|
| Example 1 | 32 | 3 | 35 | 1.1 | 50/50 | 1.5 | 99.8 | 180° C. (0° C.) |
| Example 2 | 32 | 3 | 35 | 1.1 | 30/70 | 1 | 99.8 | 183° C. (0° C.) |
| Comparative Example 1 | 32 | 3 | 35 | 1.1 | 90/10 | 2.7 | 99.8 | 139° C. 168° C. (29° C.) |

Incidentally, a saponified resin ethylene-vinyl acetate copolymer having an ethylene content of 32 mol % and a degree of solvolysis of 99.8 mol % and a saponified resin of ethylene-vinyl acetate copolymer having an ethylene content of 38 mol % and a degree of solvolysis of 99.8 mol % were manufactured by a process in which each resin was obtained through separate solvolysis; the former resin had a melting peak at 183° C. and the latter resin had a melting peak at 173° C. Furthermore, a saponified resin of modified ethylene-vinyl acetate copolymer having a content of structural units (1a) of 3 mol %, an ethylene content of 35 mol %, and a degree of solvolysis of 99.8 mol % had a melting peak at 150° C.

In Comparative Example 1, in which the EVE resin (A') and the modified EVE resin (B') were solvolyzed in one system under such conditions that the blending ratio by weight of the modified EVE resin (B') was 9 times the blending ratio of the EVE resin (A') although the ethylene content of the modified EVE resin (B') was not lower than the ethylene content of the EVE resin (A'), melting peaks were observed respectively at 139° C. (corresponding to a modified EVOH resin (B)) and 168° C. (corresponding to an EVOH resin (A)), and the difference therebetween was 29° C.

In contrast, in Example 1 and Example 2, in which the EVE resin (A') and the modified EVE resin (B') were solvolyzed in one system by the manufacturing process of the invention, i.e., the solvolysis was conducted so that the ethylene content of the modified EVE resin (B') was higher than the ethylene content of the EVE resin (A') and the blending ratio by weight of the modified EVE resin (B') was not larger than the blending ratio of the EVE resin (A'), the EVOH resin compositions each having a melting peak difference of 0° C. (namely, having only one melting peak) were obtained.

The EVOH resin compositions obtained by the manufacturing process of the invention have a reduced melting peak difference because the ethylene content of the modified EVE resin (B') was higher than the ethylene content of the EVE resin (A') and the blending ratio by weight of (B') was regulated so as to be equal to or smaller than the blending ratio of the EVE resin (A'). Since each EVOH resin composition obtained by the manufacturing process of the invention has a small melting peak difference, the composition has satisfactory meltability and improved compatibility when melt-molded, and solidifies evenly when the composition in a molten state solidifies. It can hence be seen that it is an EVOH resin composition which are less apt to suffer phase separation. Consequently, when various molded products are formed therefrom, the molded products can have a satisfactory appearance and satisfactorily exhibit the properties of the EVOH.

While the invention has been described in detail and with reference to specific embodiments thereof, it will be apparent to one skilled in the art that various changes and modifications can be made therein without departing from the spirit and scope thereof. This application is based on a Japanese patent application No. 2009-054669 filed on Mar. 9, 2009, the contents thereof being incorporated herein by reference.

INDUSTRIAL APPLICABILITY

According to the invention, an EVOH resin composition which comprises a modified EVOH resin containing a structural unit represented by the general formula (1) and a different EVOH resin and which has an especially small melting peak difference can be obtained through a simple step. Thus, an EVOH resin composition having excellent productivity and excellent melt moldability can be provided.

What is claimed is:

1. A process for manufacturing a composition of a solvolysis product of an ethylene-vinyl ester copolymer, which comprises:

conducting solvolysis of an ethylene-vinyl ester copolymer (A') and a modified ethylene-vinyl ester copolymer (B') comprising a structural unit derived from a compound represented by the general formula (2) in one system to manufacture the composition of a solvolysis product of an ethylene-vinyl ester copolymer comprising a solvolysis product (A) of the ethylene-vinyl ester copolymer and a solvolysis product (B) of the modified ethylene-vinyl ester copolymer comprising a structural unit represented by the general formula (1), wherein a ratio of an ethylene content (B')/(A') of the ethylene-vinyl ester copolymer (A') and the modified ethylene-vinyl ester copolymer (B') in the step of conducting solvolysis is 1 or more, and a blending ratio (B')/(A') of the ethylene-vinyl ester copolymer (A') and the modified ethylene-vinyl ester copolymer (B') is from 50/50 to 1/99 by weight ratio:

[Chem. 1]

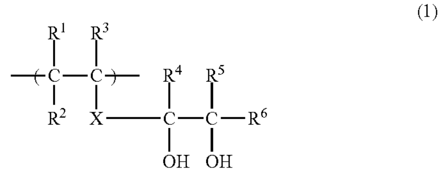

wherein $R^1$, $R^2$ and $R^3$ each independently represent a hydrogen atom or an organic group, X represents a single bond or a bonding chain, and $R^4$, $R^5$ and $R^6$ each independently represent a hydrogen atom or an organic group; and

[Chem. 2]

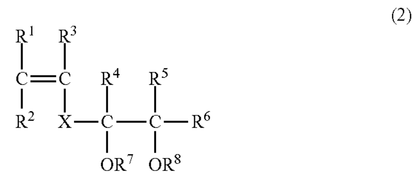

wherein $R^1$, $R^2$ and $R^3$ each independently represent a hydrogen atom or an organic group, X represents a single bond or a bonding chain, $R^4$, $R^5$ and $R^6$ each independently represent a hydrogen atom or an organic group, $R^7$ and $R^8$ each independently represent a hydrogen atom, a hydrocarbon group or $R^9$—CO— (wherein $R^9$ represents an alkyl group), $R^7$ and $R^8$ may bond to form a five-membered ring and the five-membered ring represents a cyclic carbonate structure or a cyclic acetal structure.

2. The process for manufacturing a composition of a solvolysis product of an ethylene-vinyl ester copolymer according to claim 1, wherein the modified ethylene-vinyl ester copolymer (B') comprises the structural unit derived from a compound represented by the general formula (2) in an amount of 0.1 to 30 mol %.

3. The process for manufacturing a composition of a solvolysis product of an ethylene-vinyl ester copolymer according to claim 1, wherein a difference (B')−(A') in the ethylene content between the ethylene-vinyl ester copolymer (A') and the modified ethylene-vinyl ester copolymer (B') is from 0.1 to 40 mol %.

4. The process for manufacturing a composition of a solvolysis product of an ethylene-vinyl ester copolymer according to claim 1, wherein the ethylene-vinyl ester copolymer (A') and the modified ethylene-vinyl ester copolymer (B') have the ethylene content of 20 to 60 mol %.

5. The process for manufacturing a composition of a solvolysis product of an ethylene-vinyl ester copolymer according to claim 1, wherein the composition of a solvolysis product of an ethylene-vinyl ester copolymer has a single peak, or has a difference of melting peak of 20° C. or less between the highest-temperature melting peak and the lowest-temperature melting peak when the composition has two or more melting peaks.

6. The process for manufacturing a composition of a solvolysis product of an ethylene-vinyl ester copolymer according to claim 1, wherein the composition of a solvolysis product of an ethylene-vinyl ester copolymer has an average degree of solvolysis of 90 to 100 mol %.

7. The process for manufacturing a composition of a solvolysis product of an ethylene-vinyl ester copolymer according to claim 1, wherein the composition of a solvolysis product of an ethylene-vinyl ester copolymer has an MFR of 1 to 120 g/10 min as a value measured at 210° C. under a load of 2160 g.

8. The process for manufacturing a composition of a solvolysis product of an ethylene-vinyl ester copolymer according to claim 1, wherein X represents a single bond or a hydrocarbon chain having 1 to 6 carbon atoms in the structural unit represented by the general formula (1) and the compound represented by the general formula (2).

9. The process for manufacturing a composition of a solvolysis product of an ethylene-vinyl ester copolymer according to claim 1, wherein the compound represented by the general formula (2) is a compound represented by the following general formula (2a):

[Chem. 3]

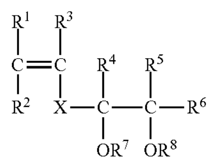

(2a)

wherein $R^1$, $R^2$ and $R^3$ each independently represent a hydrogen atom or an organic group, X represents a single bond or a bonding chain, $R^4$, $R^5$ and $R^6$ each independently represent a hydrogen atom or an organic group, and $R^7$ and $R^8$ each independently represent a hydrogen atom or $R^9$—CO— (wherein $R^9$ represents an alkyl group).

10. The process for manufacturing a composition of a solvolysis product of an ethylene-vinyl ester copolymer according to claim 1, wherein the structural unit represented by the general formula (1) is a structural unit represented by the following general formula (1a):

[Chem. 4]

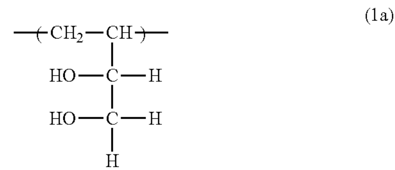

(1a)

and the compound represented by the general formula (2) is 3,4-diacyloxy-1-butene.

11. The process for manufacturing a composition of a solvolysis product of an ethylene-vinyl ester copolymer according to claim 10, wherein the compound represented by the general formula (2) is 3,4-diacetoxy-1-butene.

12. The process for manufacturing a composition of a solvolysis product of an ethylene-vinyl ester copolymer according to claim 1, wherein $R^1$ to $R^3$ each independently represent an alkyl group having 1 to 4 carbon atoms or a hydrogen atom, and $R^4$ to $R^6$ each independently represent an alkyl group having 1 to 4 carbon atoms or a hydrogen atom in the structural unit represented by the general formula (1) and the compound represented by the general formula (2).

13. The process for manufacturing a composition of a solvolysis product of an ethylene-vinyl ester copolymer according to claim 1, wherein the solvolysis is conducted under a basic condition.

14. The process for manufacturing a composition of a solvolysis product of an ethylene-vinyl ester copolymer according to claim 1, wherein the solvolysis is conducted in an alcohol or a mixed solvent of water/alcohol.

15. The process for manufacturing a composition of a solvolysis product of an ethylene-vinyl ester copolymer according to claim 1, wherein the ratio of an ethylene content (B')/(A') is from 1 to 20.

16. The process for manufacturing a composition of a solvolysis product of an ethylene-vinyl ester copolymer according to claim 1, wherein the organic group is a hydrocarbon group having from 1 to 30 carbon atoms.

* * * * *